Feb. 2, 1954
G. O. AINSWORTH
2,667,952
CLUTCH CONTROL MECHANISM
Filed Aug. 24, 1949
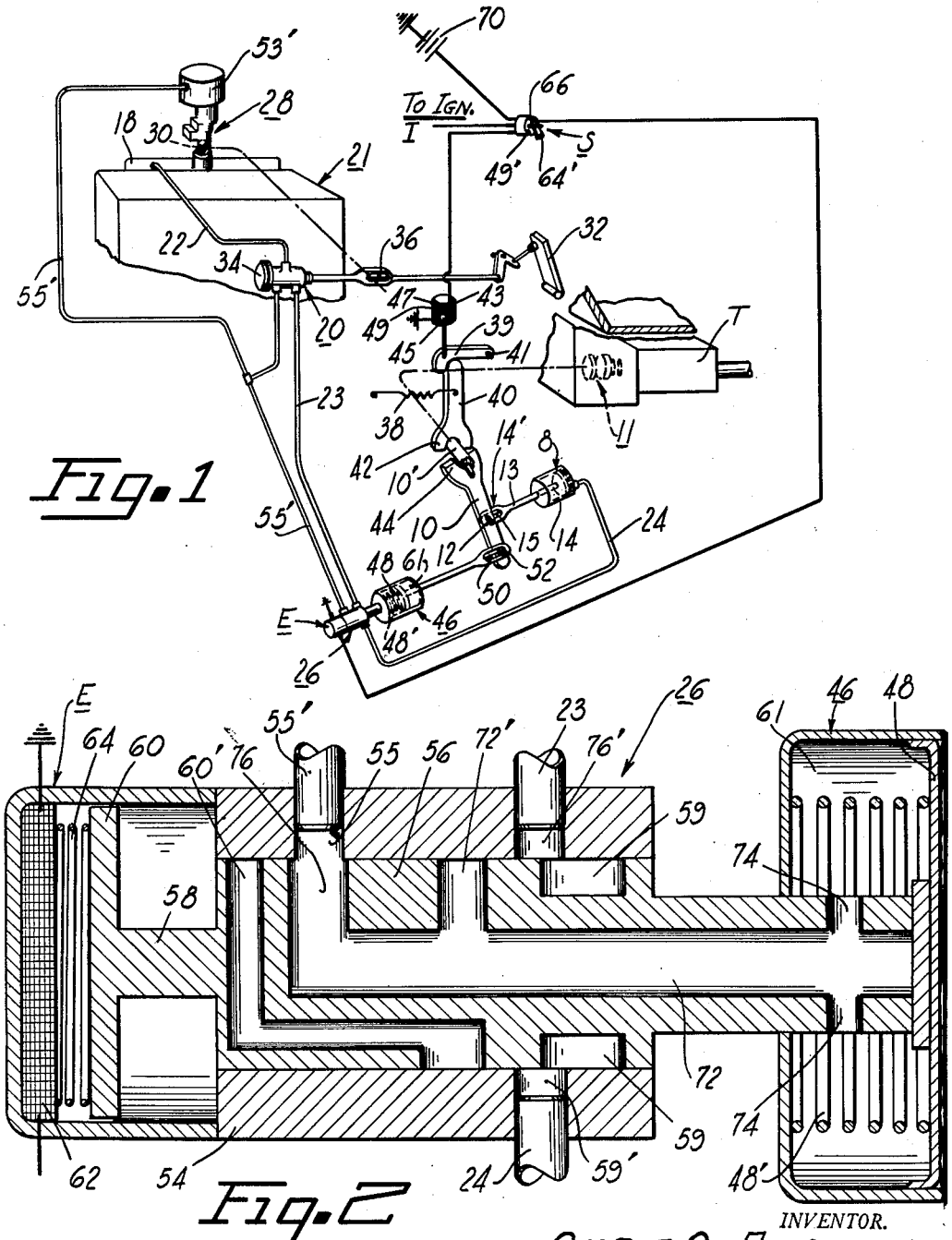
INVENTOR.
GEORGE O. AINSWORTH
BY
H. O. Clayton
ATTORNEY Patented Feb. 2, 1954

2,667,952

UNITED STATES PATENT OFFICE 2,667,952

CLUTCH CONTROL MECHANISM

George O. Ainsworth, South Bend, Ind., assignor to Bendix Aviation Corporation, South Bend, Ind., a corporation of Delaware Application August 24, 1949, Serial No. 112,126

10 Claims. (Cl. 192—.07)

1

This invention relates in general to the controls of the power plant of an automotive vehicle and is particularly applicable to a mechanism for operating the clutch mechanism of the power plant.

The friction clutch of certain automotive vehicles of the day have, for many years past, been automatically operated by power means including a pressure differential operated motor; and with certain of said mechanisms the clutch is automatically disengaged, when the accelerator is released, to facilitate an operation of the change speed transmission of the vehicle. This well known and much used clutch control mechanism, for example that disclosed in the U. S. Patent to Hill No. 2,000,331, dated May 7, 1935, includes a lost motion connection between a manually operated clutch pedal and a power operated clutch operating crank, said connection being provided both to make possible a manual operation of the clutch when the power means is for any reason inoperative and to eliminate the undesirable movement of the clutch pedal with each operation of said power means.

Now it is an object of my invention to modify the above described clutch control mechanism by doing away with the manually operated clutch pedal and substituting therefor a power operated crank arm automatically operative, to effect a disengagement of the clutch, when the ignition switch of the vehicle is moved to its off position; accordingly, it is an object of my invention to provide power means automatically operative, immediately after the engine is stopped, to effect a disengagement of the clutch. Such a mechanism does away with the clutch pedal in the driver's compartment.

A further object of my invention is to provide power means, operative when the engine of the automotive vehicle is operating, for effecting a disengaging operation of clutch means interconnecting the engine of the vehicle with the change speed transmission mechanism thereof; and to supplement this mechanism with other power means automatically operative to effect a clutch disengaging operation of said clutch means, immediately after the engine of the vehicle stops running.

Yet another object of my invention is to provide power means for operating the friction clutch of an automotive vehicle said means dispensing with the use of a manually operated clutch pedal; and my invention further contemplates the provision of power means for operating said clutch when the ignition switch of the vehicle is closed and the engine of the vehicle is running, together with power means for maintaining the clutch disengaged when the engine is not running.

The above and other objects and features of the invention will appear more fully hereinafter from a consideration of the following description taken in connection with the accompanying drawings where one embodiment of the invention is illustrated by way of example.

In the drawings:

Figure 1 is a diagrammatic view disclosing the details of a preferred embodiment of my invention; and Figure 2 is a sectional view disclosing the principal parts of the valve means of my invention.

Referring now to Figure 1 of the drawing disclosing a preferred embodiment of my invention there is provided a crank 10 drivably connected, by force transmitting means including a shaft 10', to a clutch 11 of the power plant of the vehicle. This clutch may be of the conventional type including driving and driven members biased into engagement with each other by clutch springs.

The crank 10 is preferably power operated to operate the clutch; and there is disclosed, in Figure 1, the principal elements of a well known type of clutch operating power means including a single acting vacuum operated motor 14. The power element 8 of this motor is preferably connected to the crank 10 by means of a rod 13 there being a lost motion connection 15 between the rod and crank. The latter connection includes a pin 12 secured to the crank 10 said pin extending within a clevis member 14'. The control compartment of the motor 14 is connected with the intake manifold 18 of the engine 21 of the vehicle by means of conduits 22 and 23, a three-way valve 20 interconnecting said conduits, and a conduit 24, the conduits 23 and 24 being interconnected by means of a vacuum interlock valve of a control valve unit 26. This vacuum interlock valve is disclosed in Figure 2 and is described in detail hereinafter. The engine of the vehicle is controlled in part by a carburetor 28 having a throttle valve 30, said valve being operated by means of force transmitting linkage actuated by an accelerator 32. The three-way valve 20 may be of any well known type accordingly the same is not disclosed in detail. Suffice it to say that when the accelerator is released the valve 20 is operated to interconnect the conduits 22 and 23, and a depression of the accelerator serves to break this connection and vent the conduit 22 to the atmosphere via an air cleaner 34.

Preferably the above described opening and closing operations of the three-way valve 20 are effected, respectively, during the last increment of release movement of the accelerator and the first increment of throttle opening movement of the accelerator when the same is depressed. A lost motion connection 36, Figure 1, between the throttle operating linkage and the valve operating linkage provides a means for effecting the above described operation of the valve; and the parts of the mechanism are preferably so constructed and arranged that the closing, that is venting operation of the valve 20, is completed just as the opening of the throttle is initiated.

Briefly discussing the operation of the motor 14, when the engine 21 is idling, thereby effecting a partial evacuation of the intake manifold 18, the three-way valve 20 is operative to connect the conduit 22 with the conduit 23; and as is disclosed in Figure 2 the valve 26 is at the time operative to interconnect the conduits 23 and 24. It is apparent therefore that when the accelerator is released to idle the engine and open the valve 20, the motor 14 is energized to effect a disengagement of the clutch; and when the accelerator is depressed to open the throttle the closure of the valve 20 effects a clutch engaging operation of the motor 14.

Describing now the principal feature of my invention, that is the power means for automatically effecting a disengagement of the clutch when the engine is cut off, there is provided a spring 38 connected to a crank arm 40. This crank arm is rotatably mounted on the clutch operating shaft 10' and includes a flange 42 which is constructed and arranged to contact a flange 44 on the crank 10 when the crank 40 is rotated counterclockwise by the spring 38; and this rotation results in a disengagement of the clutch. The crank 40 is rotated in a clockwise direction, to cock the spring 38, by power means including a single acting vacuum operated motor 46; and this motor is controlled by a three-way valve port of the valve unit 26. A power element 48 of the motor 46 is connected to one end of the crank 10 by means of a sliding clevis, that is lost motion connection 50 said connection including a pin 52 secured to the crank and extending through the clevis. A spring 48' serves to bias the power element 48 to the right, Figure 1.

A latch 39, pivoted at 41, serves to hold the crank 40 in its clutch engaged position, that is the position assumed when the spring 38 is cocked. This latch is biased downwardly, by a spring 43, to the position disclosed in Figure 1, said spring being interposed between one end of an armature 45 and a portion of the casing of a solenoid 47. A grounded winding 49 of the solenoid is wired to a fixed contact 49 of a manually operated switch mechanism S. This switch mechanism includes the ignition switch of the vehicle and switch means for controlling the solenoid 47 and the valve 26.

The parts of the switch S are so constructed and arranged that a movable contact 64' of said switch is in engagement with the contact 49' to close the switch 49', 64' when the ignition switch is opened to cut the engine 21 out of operation. It is apparent therefore that the solenoid 47 is energized to lift up the latch 39 when the driver of the car turns off the engine by opening the ignition switch; and this operation serves to effect a disengagement of the clutch inasmuch as when the latch 39 is lifted up the cocked spring 38 immediately operates to rotate the cranks 40 and 10 as a unit in a counterclockwise direction, Figure 1.

Describing now the valve unit 26 which includes the three-way valve for controlling the motor 46 and the vacuum cutin valve for controlling the clutch operating motor 14, this valve unit includes a casing 54, Figure 2, preferably mounted on the casing of the motor 46. This casing is bored to receive a reciprocable valve member 56 which at one of its ends, that is the right end disclosed in Figure 2, is in disconnected abutment with the power element 48 of the motor 46. The other end of the valve member 56 is elongated at 58 to provide a stem to which is secured an armature plate 60. This plate cooperates with a grounded winding 62 to provide an electromagnet, that is holding coil, serving, when the electromagnet is energized, to hold the valve member 56 in one of its operative positions; and when in this position a spring 64 is cocked to provide means for automatically moving the valve member 56 to another of its operative positions when the electromagnet is deenergized. The electromagnet is indicated by the letter E.

The grounded winding 62 is wired to a switch 64', 66 of the switch S; and the latter switch is preferably mounted on the instrument panel of the driver's compartment. The movable contact 64' of the switch S is provided with a handle portion and may be wired to a grounded battery 70. The ignition switch of the vehicle is connected to the movable contact 64' and the switch mechanism S and said mechanism is so constructed and the parts thereof are so arranged that when the ignition switch I is closed, preparatory to starting the internal combustion engine 21, the holding coil controlling switch 64', 66 is closed; and as stated above when the ignition switch is opened to cut off the engine this operation serves to close the switch 49', 64' thereby effecting an energization of the solenoid 47 to initiate a disengagement of the clutch by the operation of the spring 38. Continuing the description of the valve unit 26 the valve member 56 is bored to provide an air transmitting duct 72 which interconnects ports 74 in the right end of the member and a port 76 in said member. A rightward movement of the valve member 56, by the operation of the valve spring 64, serves to connect a control chamber 61 of the motor 46 to the source of vacuum via the ports 74, the valve duct 72, a duct 72', a port 76' in the valve casing, the conduits 23 and 22 and the valve 20; and a leftward movement, Figure 2, of the valve member 56, by the operation of the motor 46, serves to vent the chamber 61 to the atmosphere via the ports 74; the duct 72, the port 76 in the member 56, a port 55 in the valve casing, a conduit 55' and an air cleaner 53'. The duct 72 and valve ports 72', 76, 55, and 76' cooperate to make up a three-way valve of the valve unit 26 said three-way valve serving to control the motor 46. When the valve member 56 is moved to its leftward position, Figure 2, to vent the motor 46 to the atmosphere via the air cleaner 53', a recess 59 in said valve member interconnects a port 59' in the valve casing with the port 76' in said casing thereby providing a vacuum cutin valve to control the motor 14; and when the valve member 56 is moved to the right the motor 14 is vented to the atmosphere via a duct 60'. The conduit 24 serves to interconnect the motor 14 and the port 59'.

Briefly describing the complete operation of the mechanism of my invention when the engine is cut off, as a result of an ignition cut off operation of the switch S, the spring 38 becomes operative to disengage the clutch. To start the car the driver will then operate the switch S to close the ignition switch, close the switch 64', 66; and open the switch 49', 64'; and he will then start the engine thereby providing a source of vacuum in the intake manifold. The motors 46 and 14, controlled by the spring and motor operated three-way valve, the vacuum cut in valve, and the three-way valve 20, will then be successively energized to first cock the spring 38 and then disengage the clutch; and in this operation the end of the crank 40, acting as a cam, momentarily raises the latch 39.

To get the vehicle under way the driver will place the transmission T in gear, and he will then depress the accelerator to effect an opening of the throttle and a clutch engaging operation of the motor 14.

If the vehicle is then brought to a stop and the switch S is actuated to open the ignition switch and the switch 64', 66 and close the switch 49', 64', there will automatically result an operation of the spring 38 to disengage the clutch and an expansion of the spring 64 to effect the preselecting operation of the three-way valve of the valve unit 26.

There is thus provided, by the mechanism of my invention, power means for operating the friction clutch under all conditions of service there being no need for a manually operated clutch pedal. The omission of a clutch pedal increases the leg room in the driver's compartment; and the provision of a mechanism for automatically disengaging the clutch when the engine is cut off makes it possible both to start the engine and to place the transmission T in gear, prior to starting the engine; all without disengaging the clutch. With the mechanisms of most cars of the day it is usually the practice to disengage the clutch, by a depression of the clutch pedal, prior to starting the engine.

Although only one embodiment of the invention has been illustrated and described, various changes in the form and relative arrangements of the parts may be made to suit requirements.

I claim:

1. In an automotive vehicle provided with an internal combustion engine, a change speed transmission and clutch means for interconnecting or disconnecting the engine and transmission; power means for effecting a disconnecting operation of the clutch means including a fluid pressure operated motor, said motor being operative to effect said disconnecting operation when the engine is operating, valve means for controlling the operation of the motor, and means for controlling the operation of said valve means; together with other power means for automatically effecting a disconnecting operation of the clutch means, said other power means including a spring, a fluid pressure operated motor for cocking said spring, and means for controlling the operation of the latter motor.

2. In an automotive vehicle provided with an internal combustion engine, an ignition switch including an auxiliary current contact, a change speed transmission and clutch means for interconnecting or disconnecting the engine and transmission; power means for effecting a disconnecting operation of the clutch means including a fluid pressure operated motor operative to effect said operation when the engine is operating, valve means for controlling the operation of the motor, and means for controlling the operation of said valve means; together with other power means for automatically effecting a disconnecting operation of the clutch means when the ignition switch is established in its ignition off position and the auxiliary contact is closed, said other power means including a spring, a single acting fluid pressure motor for cocking said spring, and means, including a motor and spring operated valve, for controlling the operation of the latter motor.

3. In an automotive vehicle provided with an internal combustion engine, a change speed transmission and clutch means for interconnecting or disconnecting the engine and transmission; power means for effecting a disconnecting operation of the clutch means including a fluid pressure operated motor operative to effect said disconnecting operation when the engine is operating, valve means, including a three-way valve, for controlling the operation of the motor and means, including means actuated by the accelerator of the vehicle, for controlling the operation of said valve means; together with other power means, including a spring, for automatically effecting a disconnecting operation of the clutch means, said other power means including a spring, a single acting fluid pressure operated motor for cocking said spring, and means, including a motor and a spring operated valve, for controlling the operation of the latter motor.

4. Mechanism for actuating the friction clutch of an automotive vehicle including a crank, a pressure differential operated motor connected to the crank and capable of being operated, when the engine of the vehicle is in operation, to effect a disengagement of the clutch and valve means for controlling the operation of the motor; together with power means, including a spring operated crank, for actuating the aforementioned crank to effect a disengagement of the clutch and electrically operated means for controlling the operation of said spring operated crank.

5. Mechanism for actuating the friction clutch of an automotive vehicle including a crank, a pressure differential operated motor connected to the crank and capable of being operated, when the engine of the vehicle is in operation, to effect a disengagement of the clutch, valve means, including an accelerator operated three-way valve and a power operated vacuum cut-in valve, for controlling the operation of the motor; together with power means, including a spring operated crank and a spring operating pressure differential operated motor, for actuating the aforementioned crank to effect a disengagement of the clutch.

6. Mechanism for actuating the friction clutch of an automotive vehicle including a crank, a pressure differential operated motor connected to the crank and capable of being operated, when the engine of the vehicle is in operation, to effect a disengagement of the clutch, other means, including a crank, a spring for actuating the crank, and a pressure differential operated motor for cocking said spring, for operating the first mentioned crank to effect a disengagement of the clutch; and means for controlling the operation of the two motors to successively effect their energization to effect the aforementioned operations, that is cock the spring and disengage the clutch.

7. Power means for operating the friction clutch of an automotive vehicle including a crank, a pressure differential operated motor having its power element connected to the crank, said motor being operable to actuate the crank to disengage the clutch when the engine of the vehicle is operating; together with power means, including a spring, a crank arm associated with said first mentioned crank and electrically operated means to control the operation of said crank arm to effect a disengagement of the clutch by actuating said crank.

8. In an automotive vehicle provided with an internal combustion engine, a change speed transmission and means, including a clutch mechanism, interconnecting the engine and transmission, means for effecting a disengaging operation of the clutch mechanism including a fluid pressure operated motor, valve means for controlling the operation of the motor, other power means operable to effect a disengaging operation of the clutch mechanism; and means, including a hand operated control mechanism, for controlling the operation of the engine and both of the clutch operating means.

9. In an automotive vehicle provided with an internal combustion engine and clutch mechanism; means for effecting a disengaging operation of the clutch mechanism including a fluid pressure operated motor, valve means, including a three way valve operated by the accelerator of the vehicle, for controlling the operation of the motor, other means, including a spring operated crank, operable to effect a disengaging operation of the clutch mechanism; and means, including a hand operated control mechanism, for controlling the operation of the engine and both of the clutch operating means.

10. In an automotive vehicle including a friction clutch, an ignition switch, and hand operated means for operating said switch; clutch operating power means including a pressure differential operated motor and means for controlling the operation of said motor including a switch associated with the ignition switch and operated by the aforementioned hand operated means; together with other power means, including another switch associated with the ignition switch and which is also operated by the hand operated means, for disengaging the clutch when the hand operated means is placed in position to open the ignition switch and close the said another switch.

GEORGE O. AINSWORTH.

References Cited in the file of this patent

UNITED STATES PATENTS

| Number | Name | Date |
|---|---|---|
| 1,972,446 | Jander | Sept. 4, 1934 |
| 2,031,062 | Peabody | Feb. 18, 1936 |
| 2,348,435 | Hey | May 9, 1944 |
| 2,536,462 | Price | Jan. 2, 1951 |